United States Patent [19]

Fisher

[11] 3,862,727

[45] Jan. 28, 1975

[54] SEAT BELT RETRACTOR WITH ELECTRIC CONTROL SWITCH

[76] Inventor: Robert C. Fisher, 580 E. Long Lake Rd., Bloomfield Hills, Mich. 48013

[22] Filed: Apr. 20, 1972

[21] Appl. No.: 245,927

[52] U.S. Cl. .................. 242/107.4, 200/61.58 B
[51] Int. Cl. .................. A62b 35/00, B65h 75/48
[58] Field of Search ...... 242/107.4, 107.5 B, 107 R; 297/384, 385, 386, 387, 388; 340/52; 200/61.58 B, 52 R; 280/150 SB

[56] References Cited
UNITED STATES PATENTS

| | | | |
|---|---|---|---|
| 3,504,336 | 3/1970 | Boblitz | 340/52 |
| 3,667,698 | 6/1972 | Fisher | 242/107.4 |

*Primary Examiner*—Stanley N. Gilreath
*Assistant Examiner*—John M. Jillions

[57] ABSTRACT

A locking seat belt retractor has an electric circuit added thereto containing contacts which are separated to open the circuit when the belt has been unwound a predetermined amount from the spool of the retractor.

9 Claims, 7 Drawing Figures

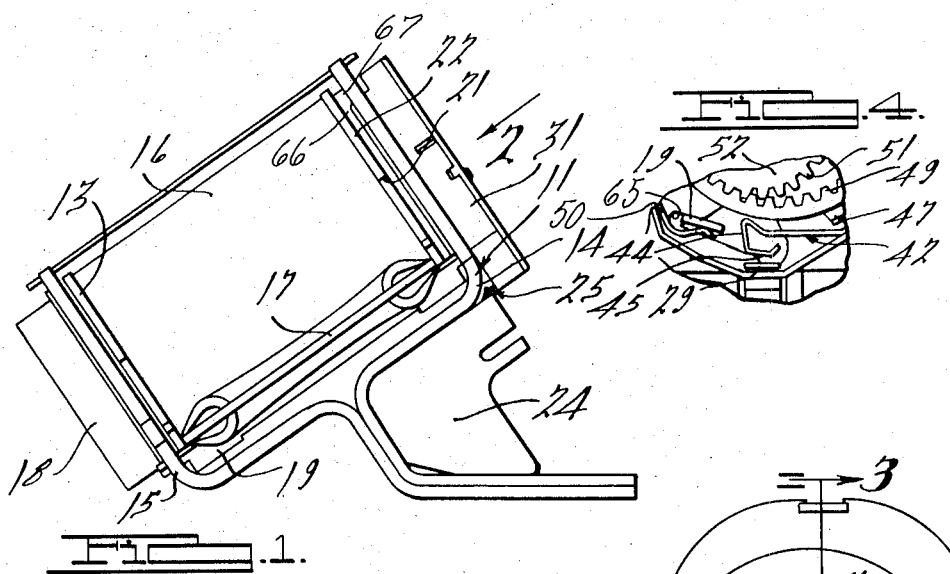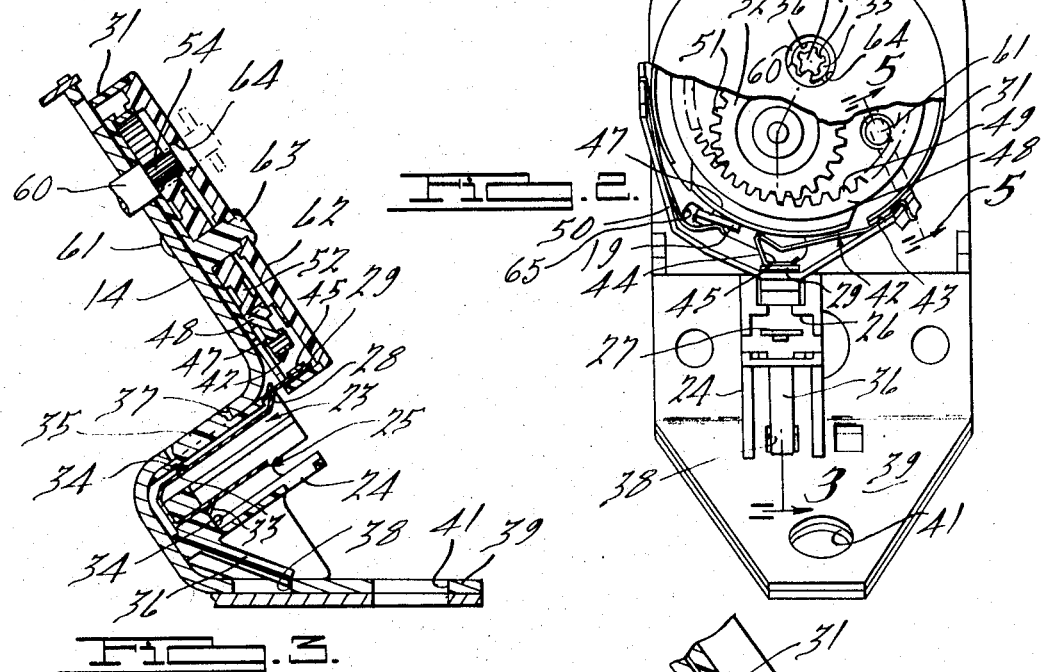

SEAT BELT RETRACTOR WITH ELECTRIC CONTROL SWITCH

RELATED APPLICATION

R. C. Fisher's application, Ser. No. 108,923, filed Jan. 22, 1971, for LOCKING SEAT BELT RETRACTOR now issued Pat. No. 3,667,698 is of interest in showing a belt retractor to which the circuit of the present invention is applied.

SUMMARY OF THE INVENTION

The invention relates to an electric circuit containing contacts that are broken when the seat belt retractor is actuated by pulling a predetermined length of the belt therefrom. The opening of the circuit appraises the operator of the automotive vehicle that the seat belts are in use. The seat belt retractor has the electric elements of the circuit applied thereto which are separated when the tongue on the retractor belt is withdrawn and secured to the buckle on the other belt section. The retractor will wind up the belt to have a predetermined tension thereon and will prevent the protraction of the belt thereafter.

A plastic housing has snap on securing fingers which locks it to the retractor. A conductor is mounted in the housing formed to have a male terminal at one end and a fixed contact at the other end which are insulated from the metal of the retractor. A movable spring contact is engageable with the fixed contact and is grounded to the frame of the retractor and operated by a cam into engagement and disengagement with the fixed contact. The cam is driven when the belt is withdrawn and after the withdrawal of a predetermined length of the belt, the cam releases the spring contact which moves away from the fixed contact to break the circuit. The point of breaking the circuit relative to the length of the belt protracted can be changed by adjusting the cam position by advancing the driving gear to separate the contacts while the predetermined length of belt is maintained. Upon the retraction of the belt, the contacts are moved into engagement to complete the circuit. By changing the relation of the fixed and movable contacts, the contacts can be closed upon the withdrawal of the belt from the retractor and be opened when the belt is retracted.

BRIEF DESCRIPTION OF THE DRAWING

FIG. 1 is a view in side elevation of a seat belt retractor having an electric circuit therein embodying features of the present invention;

FIG. 2 is an end view of the structure illustrated in FIG. 1 with parts broken away, as viewed from the point 2 thereof with the electric contacts in closed position;

FIG. 3 is a sectional view of the structure illustrated in FIG. 2, taken on the line 3—3 thereof;

FIG. 4 is broken view of the structure illustrated in FIG. 2, showing the electric contacts in open position;

FIG. 5 is an enlarged broken sectional view of the structure illustrated in FIG. 2, taken on the line 5-5 thereof;

FIG. 6 is a perspective view of the fixed contact of the circuit, and

FIG. 7 is a perspective view of the movable contact of the circuit.

DESCRIPTION OF THE PREFERRED EMBODIMENT

A seat belt retractor 11 comprises a frame 12 for supporting a spool 13 between spaced arms 14 and 15. The spool 13 has a belt 16 wound thereon which has a tongue 17 on the extending end by which the belt is unwound from the spool 13 and secured in a buckle (not shown) on the other belt section. When the tongue 17 is released from the buckle, a spring, such as a clock spring, within a housing 18 operates the spool 13 to have the belt 16 wound thereon. A pawl or latch member 19 moves into and out of engagement with teeth 21 on discs 22 of the spool 13 adjacent to the arms 14 and 15 of the frame 12. After the tongue 17 is attached to the buckle, any slack in the belt 16 is automatically taken up by the spring of the retractor 11 which exerts a constant torque on the spool 13. Thereafter, a belt 16 is locked against protraction by the engagement of the pawl or latch member 19 with the teeth 21 of the spool.

An electric switch 23 is mounted on the frame 12 and is opened upon the operation of the spool 13 during the protraction of the belt. A housing 24 of insulating material supports a conductor 25 which is bent in U-shape with one branch mounted centrally within a plug-receiving recess 26 to form a male terminal 27. The opposite end of the conductor 25 is sloped outwardly at 28 and extended upwardly to form a contact 29 disposed within a housing 31 of insulating material. The terminal 27 and the opposite portion 23 of the conductor 25 have fingers 33 cut therefrom and deflected outwardly thereof for engaging recessed shouldered portions 34 within the housing 24 to prevent the removal of the U-shaped conductor after being inserted therein. The insulated housing 24 has an elongated rib 35 on the inner face and a flexible projecting finger 36 on the outer face. The rib 35 projects within a slot 37 in the frame 12 and the finger 36 is sprung within a slot 38 in the securable foot 39 of the frame 12. An aperture 41 through the foot 39 permits the securing of the foot to a member which is preferably the floor of an automotive vehicle.

A movable contact 42, as illustrated in FIGS. 2 and 7, has one end anchored in a slot 43 in the wall of the insulating housing 31. The contact end 44 has a contact portion 45 and an apex portion 46 which is engageable by a cam 37 on a cam ring 48 having teeth 49 on its inner edge. The teeth 49 mate with teeth 51 on a spur gear 52 which are engageable by the teeth 53 of a pinion gear 54. The pawl 19 is engaged by the cam 47 and urged against the wall of a slot 65 by a spring 50 secured to the wall of the housing 31. When released by the cam 47 as the belt is protracted, the pawl 19 is retained in unoperative position against the wall of a slot 65 in the spaced arms 14 and 15 by the spring 50 until the belt it is slightly retracted. As illustrated and described in the above setforth patent, a cam plate 66 is held in frictional engagement with the abutting end of the spool 13 by a spring with the finger 67 extending into a slot in the frame for limiting the movement of the cam plate. A notch is provided in the cam plate which engages the edge of the pawl 19 when deflected by the cam 47 to hold it out of engagement with the teeth 21 of the spool while the belt is continuously protracted. The slight retraction of the belt releases the pawl which is urged by the spring 50 into engagement with the teeth 21 of the spool 13 to prevent further protraction of the belt. The pinion gear 54 is mounted in a material 55 within a recess 56 at one end of the shaft 60 of the spool 13 to provide a friction drive for the pinion gear 54 while permitting its movement relative to the shaft. When the belt is protracted, the spool 13 rotates, rotating the pinion gear 54 and the spur gear 52 which rotates the ring gear 48 to advance the cam 47 to release the pawl 19 and the apex portion 46 of the movable contact 42. This permits the engaging portion 45 to move from engagement with the contact 29, as illustrated in FIG. 4. The release of the pawl and the separation between the contacts 45 and 29 occurs after a predetermined length of belt has been protracted. The point where this occurs relative to the length of belt protraction is adjusted by a tool having an internal gear shaped recess which engages the end of the pinion gear 54 which, as illustrated in FIG. 3, extends beyond the spur gear 52. The tool turns the pinion gear 54 within the end of the shaft 60 and drives the spur gear 52 and ring gear 48 until the cam 47 disengages from the apex portion 46 of the movable contact 42. The opening of the circuit will always occur at this point upon the protraction of the belt and can be changed from time to time if desired. The belt will continue to be protracted after the separation of the contacts until the tongue 17 has been locked within the buckle and the belt retracted by the spool to have a predetermined tension thereon. The engagement of the pawl or locking member 19 with the teeth 21 of the discs 22 prevents the protraction of the belt until it has been released from the buckle and fully retracted onto the spool. Upon the retraction of the belt, the cam 47 will again engage the apex portion 46 of the movable contact 42 to move the contact portion 45 thereof into engagement with the fixed contact 29 thereby completing the circuit.

A circuit through the ignition switch passes through each of the contacts to a lamp and/or buzzer or the like to provide a warning signal that the seat belt is not in use. At the end of a journey, when the ignition switch is cut off, no light or sound will be produced upon the release of the belts and the engagement of the contacts. When the car is again occupied and the ignition switch turned on, a light, sound or both will be produced if one of the belts has not been protracted, at least to a degree to open the contacts of the circuit. When no light is lit or sound produced when the ignition switch is on, the operator of the vehicle will know that all of the seat belts are in use.

It is within the purview of the invention to have the contact portion 45 of the movable contact 42 disposed on the opposite side of the contact 29 so as to be disengaged when the belt is retracted, as illustrated in FIG. 2, or engaged when the seat belt has been protracted a predetermined amount, as illustrated in FIG. 4. With such an arrangement, the making and breaking of the circuits occurs in the same manner as that described above. When all of the contacts are connected in series with each other and the ignition switch, all of the contacts must be closed before the engine can be started. If during the driving of the vehicle, an occupant releases a belt, this will break the ignition circuit through the switch and will cause the vehicle to come to a halt until the contacts of the unused belt are closed, thus assuring the use thereof.

The movable contact 42 has a section 58 which is arcuately bent to have a ground finger 50 engage the metal arm 14 and be secured thereto by a rivet 61, two of which retain the housing 31 in fixed relation to the arm. The housing is enclosed by a cap 62 which is secured thereto by a flanged stud 63 which passes therethrough. The cover has an aperture 64 through which the tool which engages the pinion gear 54 can pass to rotate it relative to the shaft of the spool 13 to adjust the point of disengagement between the cam 47 and the apex portion 46 of the contact 42. With this arrangement, the conductor 25 and the flexible contact 42 are completely insulated from the metal frame 12 except for the grounded finger 59.

I claim:

1. In a locking seat belt retractor, a frame, a shaft, a spool mounted on said shaft for rotation therewith on said frame, said spool having ratchet teeth, a flexible belt secured to and adapted to be wound on said spool, a spring constantly urging the spool in a direction to effect retraction of the belt thereon, cam means coupled to said spool to rotate when said spool rotates, a pawl pivoted on said frame and engagement with the ratchet teeth of said spool to lock the spool against rotation in the direction of belt protraction, spring means biasing said pawl toward engagement with said ratchet teeth so that said pawl moves from a first position in engagement with said cam means and out of engagement with said ratchet teeth to a second position in engagement with said ratchet teeth and in the path of rotation of said cam means upon a predetermined rotation of said spool, and an electrical switch supported on said frame having a fixed contact and a flexible contact movable by said cam means from a position separated from said fixed contact and in the path of rotation of said cam means to a flexed position in contact with said fixed contact.

2. In a locking seat belt retractor as recited in claim 1, wherein means are provided on said spool for operating said cam means when said spool is rotated.

3. In a locking seat belt retractor as recited in claim 2, wherein the operating means on said spool is adjustable relative thereto for changing the rotational position of said cam from said pawl and contacts relative to the length of belt retracted.

4. In a locking seat belt retractor, a frame, a shaft, a spool mounted on said shaft for rotation therewith on said frame, said spool having ratchet teeth, a flexible belt secured to and adapted to be wound on said spool, a spring constantly urging the spool in a direction to effect retraction of the belt thereon, a pawl pivoted on said frame and engageable with the ratchet teeth of said spool to lock the spool against rotation in the direction of belt protraction, means to move the pawl into engagement with said ratchet teeth upon a predetermined belt protraction, cam means coupled to said spool to rotate when said spool rotates, an electrical switch supported on said frame having a fixed contact and a flexible contact movable by said cam means from a position separated from said fixed contact and in the path of rotation of said cam means to a flexed position in contact with said fixed contact, said fixed contact being provided on one end of a U-shaped conductor with a terminal at the other end, said movable contact being supported on said frame for engagement with said fixed contact, and an insulating member having a plug receiving recess secured to said frame for supporting said fixed contact adjacent to the movable contact and the terminal within said plug receiving recess.

5. In a locking seat belt retractor as recited in claim 4, wherein said frame has recesses in opposite walls, and wherein a projecting rib and a flexible finger on said insulating member are engageable in said recesses for supporting said insulating member on the frame, an insulating casing on one end of said frame into which said fixed contact extends, said flexible contact and said cam means being housed in said casing.

6. In a locking seat belt retractor as recited in claim 4, wherein a spring within said casing biases said pawl toward engagement with said ratchet teeth so that said pawl moves from a first position in engagement with said cam means and out of engagement with said ratchet teeth to a second position in engagement with said ratchet teeth and in the path of rotation of said cam means upon a predetermined rotation of the spool.

7. In a locking seat belt retractor as recited in claim 4, wherein the cam means is mounted on a cam ring having internal teeth, a pinion gear is mounted on the spool shaft and a spur gear is meshed with said pinion gear and said internal teeth of said cam ring to rotate said cam ring when said pinion gear rotates.

8. In a locking seat belt retractor as recited in claim 7, wherein a friction drive is provided between said pinion gear and the spool shaft to permit the pinion gear to be rotated independently of the shaft to adjust the cam means to a point of release conforming to a predetermined length of protracted belt.

9. In a locking seat belt retractor, a frame, a shaft, a spool mounted on said shaft for rotation therewith on said frame, said spool having teeth, a flexible belt adapted to be wound on said spool, a spring constantly urging the spool in a direction to effect retraction of the belt thereon, a pawl pivoted on said frame and engageable with the teeth of said spool to lock the spool against rotation in the direction of belt protraction, a pinion gear on the spool shaft frictionally driven thereby and movable relative thereto, an electric switch supported on said frame having a fixed contact and a flexible contact movable by said cam means from a position separated from said fixed contact and in the path of rotation of said cam means to a flexed position in contact with said fixed contact, cam means coupled to said pinion gear to rotate when said pinion gear rotates, and spring means biasing said pawl toward engagement with said ratchet teeth so that said pawl moves from a first position in engagement with said cam means and out of engagement with said ratchet teeth to a second position in engagement with said ratchet teeth and in the path of rotation of said pinion gear.

* * * * *

UNITED STATES PATENT OFFICE
CERTIFICATE OF CORRECTION

Patent No. 3,862,727  Dated  January 28, 1975

Inventor(s)  Robert C. Fisher

It is certified that error appears in the above-identified patent and that said Letters Patent are hereby corrected as shown below:

Column 2, line 30, "23" should be --32--. Column 2, line 47, "37" should be --47--. Column 3, line 66, "50" should be --59--. Column 4, line 20, Claim 1, "engagement" should be --engageable--. Column 5, line 16, Claim 6, "the" should be --said--.

Signed and Sealed this

*eighth* Day of *June 1976*

[SEAL]

Attest:

RUTH C. MASON
*Attesting Officer*

C. MARSHALL DANN
*Commissioner of Patents and Trademarks*